(12) United States Patent
Habu et al.

(10) Patent No.: US 8,478,582 B2
(45) Date of Patent: Jul. 2, 2013

(54) SERVER FOR AUTOMATICALLY SCORING OPINION CONVEYED BY TEXT MESSAGE CONTAINING PICTORIAL-SYMBOLS

(75) Inventors: Yukiko Habu, Saitama (JP); Ryoichi Kawada, Saitama (JP); Nobuhide Kotsuka, Saitama (JP); Sung Jiae, Saitama (JP); Koki Uchiyama, Tokyo (JP); Santi Saeyor, Tokyo (JP); Hirosuke Asano, Tokyo (JP); Toshiaki Shimamura, Tokyo (JP)

(73) Assignee: KDDI Corporation, Tokyo (JP)

( * ) Notice: Subject to any disclaimer, the term of this patent is extended or adjusted under 35 U.S.C. 154(b) by 792 days.

(21) Appl. No.: 12/698,486

(22) Filed: Feb. 2, 2010

(65) Prior Publication Data

US 2010/0198584 A1 Aug. 5, 2010

(30) Foreign Application Priority Data

Feb. 4, 2009 (JP) ................. 2009-023311

(51) Int. Cl.
*G06F 17/27* (2006.01)
*G06F 17/21* (2006.01)
*G10L 15/14* (2006.01)
*G10L 13/00* (2006.01)
*G10L 13/08* (2006.01)
*G10L 21/00* (2006.01)

(52) U.S. Cl.
USPC ............. 704/9; 704/10; 704/256; 704/258; 704/260; 704/270; 704/270.1; 704/275

(58) Field of Classification Search
USPC ........... 704/9, 10, 256, 258, 260, 270, 270.1, 704/275
See application file for complete search history.

(56) References Cited

U.S. PATENT DOCUMENTS 7,475,007 B2 1/2009 Kanayama et al.
7,600,017 B2 * 10/2009 Holtzman et al. ............ 709/224

(Continued)

FOREIGN PATENT DOCUMENTS

JP 2007-219733 A 8/2007
JP 3962382 B2 8/2007

OTHER PUBLICATIONS

Japanese Office Action dated Feb. 8, 2013, issued in corresponding Japanese Patent Application No. 2009-02331, with Partial Translation (4 pages).

(Continued)

*Primary Examiner* — Edgar Guerra-Erazo
(74) *Attorney, Agent, or Firm* — Westerman, Hattori, Daniels & Adrian, LLP

(57) ABSTRACT

A server is disclosed for computing a score of an opinion that a message in a text file is expected to convey regarding a subject to be evaluated, wherein the message is written using literal strings and pictorial symbols. In this server, by the use of a pictorial-symbol dictionary memory storing a correspondence between designated pictorial-symbols to be rated and scores of opinions expressed by the respective pictorial-symbols, at least one of the used pictorial-symbols in the message which is coincident with at least one of the designated pictorial-symbols stored in the pictorial-symbol dictionary memory, is extracted from the message, at least one of the opinion scores which corresponds to the at least one extracted pictorial-symbol is retrieved within the pictorial-symbol dictionary memory, and an aggregate net opinion score for the message is calculated, based on an aggregate opinion score for the at least one extracted pictorial-symbol.

8 Claims, 9 Drawing Sheets

U.S. PATENT DOCUMENTS

| | | | | |
|---|---|---|---|---|
| 7,640,304 | B1* | 12/2009 | Goldscheider | 709/205 |
| 7,996,210 | B2* | 8/2011 | Godbole et al. | 704/9 |
| 8,010,474 | B1* | 8/2011 | Bill | 706/46 |
| 2003/0069936 | A1* | 4/2003 | Warner et al. | 709/206 |
| 2005/0058261 | A1* | 3/2005 | Baumard | 379/67.1 |
| 2005/0216568 | A1* | 9/2005 | Walkush et al. | 709/207 |
| 2006/0031375 | A1* | 2/2006 | Danker et al. | 709/207 |
| 2006/0059237 | A1* | 3/2006 | Wilcox | 709/206 |
| 2006/0085515 | A1* | 4/2006 | Kurtz et al. | 709/207 |
| 2007/0061814 | A1* | 3/2007 | Choi et al. | 719/313 |
| 2007/0094330 | A1* | 4/2007 | Russell | 709/206 |
| 2007/0124387 | A1* | 5/2007 | Galloway | 709/206 |
| 2007/0286072 | A1* | 12/2007 | Baumard | 370/229 |
| 2008/0278520 | A1* | 11/2008 | Andreasson | 345/647 |
| 2009/0144366 | A1* | 6/2009 | Lyle | 709/204 |
| 2010/0179991 | A1* | 7/2010 | Lorch et al. | 709/206 |

OTHER PUBLICATIONS

"Dentsu Buzz Research", Dentsu, Inc., https://www.dbuzz.jp, visited Nov. 22, 2008. (including statement of relevance, English).

"Nikkei Research Blog Viz Sensor", published by Nikkei Research, Inc., http://viz.nikkei-r.co.jp, visited on Dec. 19, 2008. (including statement of relevance, English).

* cited by examiner

| PICTORIAL SYMBOL | CATEGORY | TITLE | OPINION SCORE | INTENSITY RATE |
|---|---|---|---|---|
|  | EMOTION AND HUMAN BODY | TWINKLING | POSITIVE P | |
|  | EMOTION AND HUMAN BODY | EMPHASIS | | 1.2 |
|  | EMOTION AND HUMAN BODY | HEART | POSITIVE P | |
|  | FACE AND EXPRESSION | IMPATIENCE | NEGATIVE N | |
|  | FACE AND EXPRESSION | TEAR DROPPING | NEGATIVE N | |
|  | FACE AND EXPRESSION | WINK | POSITIVE P | |
|  | EMOTION AND HUMAN BODY | ANGER | NEGATIVE N | |
|  | FACE AND EXPRESSION | TRIUMPH | | 1.1 |

FIG.2

| LITERAL STRING | | OPINION SCORE |
| --- | --- | --- |
| JAPANESE | ENGLISH | |
| スペシャル | SPECIAL | POSITIVE P |
| ウキウキ | FLOATING ON AIR | POSITIVE P |
| 悔しい | DISAPPOINTED | NEGATIVE N |
| バカやろー | HOW FOOLISH I AM | NEGATIVE N |
| ..... | ..... | |

It starts today, you know.
✳So, it is that Detective Drama✳
It is a special program. I am
floating on air 🌱
But, Kaoru-chan's last story ... 🌐
Ah, I wonder how her story will
end.
If she dies in the line of duty
... If it happens, I am 😢 .

FIG.8

I missed the 9 o'clock Monday TV show last night 
I am disappointed  I am so disappointed that I am staying in bed in sulking (laughing). How foolish I am 
FIG.9

SERVER FOR AUTOMATICALLY SCORING OPINION CONVEYED BY TEXT MESSAGE CONTAINING PICTORIAL-SYMBOLS

CROSS-REFERENCE TO RELATED APPLICATIONS

The present application is based on and claims the benefit of priority from Japanese Patent Application No. 2009-023311 filed Feb. 4, 2009, the content of which is incorporated herein by reference in its entirety.

BACKGROUND OF THE INVENTION

1. Field of the Invention

The invention relates generally to techniques of automatically scoring an opinion conveyed by a text message.

2. Description of the Related Art

In many cases, reviews and criticisms on products and services are made and published by distributors and advertising companies (e.g., professionals). However, a vast amount of information on user experiences and reviews has been collected into particular web sites over the Internet. Such information, which is not susceptible to any interests, could be a very important guide to other potential users or consumers in selection of products and services.

A lot of attention has been focused on CGM (Consumer-Generated Media) over the Internet, acting as media generated by a large number of non-professional consumers. More specifically, this is one of Web 2.0 sites, which has database and media using contents published by individual persons, such as blogs (Web logs), "word-of-mouth" websites, "Q&A" community websites, SNS (Social Networking Service), or COI (Community-of-Interest) websites. A wide variety of information is exchanged therebetween, which is not limited to information on products and services, but extends to content on ordinary activities of daily life.

However, information or media content handled in the CGM is extremely large in amount and complicated in substance. In addition, individual-person comments or reviews are expressed with text messages written using literal strings or strings of literal characters, in general.

For these reasons, a third party who wants to reference those individual-person comments or reviews is required to closely read the relevant text messages, because a mere sight of the text messages cannot lead to better understanding of those individual-person comments or reviews. In addition, a third party has to view text messages more difficultly for analyzing sentiments or reviews from a larger number of non-professional consumers.

Under these circumstances, in recent years, "Opinion Analysis Service" has been provided, which is a kind of service allowing text files which individual persons have transmitted or submitted to a particular website over the Internet, to be retrieved, and allowing the content of these text files to be scored or rated, to thereby perform an opinion analysis, as disclosed in, for example, the following non-patent literature:

"NIKKEI RESEARCH blogViz SENSOR," published by Nikkei Research Inc., URL: http://viz.nikkei-r.co.jp, visited on Dec. 19, 2008; and "DENTSU BUZZ RESARCH," published by Dentsu Inc., URL: https://www.dbuzz.jp, visited on Nov. 22, 2008.

One of conventional opinion analysis servers for providing the aforementioned opinion analysis service, as disclosed in, for example, Japanese Patent No. 3962382, firstly inputs a text file, and, by morphological analysis, segments the input text file into morphemes. Then, this server, after scoring the meaning of each morpheme, scores an opinion conveyed by the text file. This allows a user, by a mere sight of the score of the opinion, to understand the opinion conveyed by the input text file.

Japanese Patent No. 3962382 corresponds to U.S. Pat. No. 7,475,007, the content of which is incorporated hereinto by reference in its entirety.

In recent years, as a mobile phone environment develops, transmission and submission of text files from a mobile phone to a Web server has become increasingly popular. A text message transmitted from a mobile phone, however, in many cases, defies an ordinary linguistic grammar (e.g., a Japanese language grammar), as is different from when a text message is transmitted from a personal computer.

More specifically, in the application of a mobile phone, a text message is written using "pictorial symbols" as direct representations of particular emotions. A user of a mobile phone uses such a pictorial symbol to supplement and emphasize another word representative of a particular emotion in the same text message.

However, when a known opinion analysis service is provided for a given text message including pictorial symbols, known linguistic-dependency analysis cannot be successfully performed for the given text message because of its failure to be recognized as a grammatically-correct message due to the presence of pictorial symbols. In an example, a pictorial symbol is located at a position where the subject of a particular sentence should be located.

In addition, when a known opinion analysis service is provided for a given text message in which a pictorial symbol is used to emphasize or supplement a particular emotion represented by another literal string in the same text message, the pictorial symbol is only recognized as a mere symbol per se.

Overall, a known opinion analysis service cannot successfully analyze a text message written by a user of a data terminal such as a mobile phone using a pictorial symbol, based on the pictorial symbol, even if the pictorial symbol is used as a direct representation of a particular emotion.

In view of the foregoing, it would be desirable to provide techniques of allowing an opinion which is conveyed by a text message, to be successfully analyzed and scored, even if the text message includes a pictorial symbol.

BRIEF SUMMARY OF THE INVENTION

In general, the invention relates to techniques of automatically scoring an opinion conveyed by a text message containing pictorial symbols.

According to some aspects of the invention, by the use of a pictorial-symbol dictionary memory storing a correspondence between designated pictorial-symbols to be rated and scores of opinions expressed by the respective pictorial-symbols, at least one of the used pictorial-symbols in the message which is coincident with at least one of the designated pictorial-symbols stored in the pictorial-symbol dictionary memory, are extracted from the message.

Further, at least one of the opinion scores which corresponds to the at least one extracted pictorial-symbol is retrieved within the pictorial-symbol dictionary memory.

Still further, an aggregate net opinion score for the message is calculated, based on an aggregate opinion score for the at least one extracted pictorial-symbol, wherein the aggregate opinion score is calculated with the at least one retrieved opinion score for the at least one extracted pictorial-symbol.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a pictorial-symbol dictionary table incorporated in the opinion analysis server depicted in FIG. 1, for indicating a correspondence between designated pictorial-symbols, opinion scores, and intensity rates only for modificative pictorial-symbols;

FIG. 3 is a literal-string dictionary table incorporated in the opinion analysis server depicted in FIG. 1, for indicating a correspondence between designated literal-strings, and opinion scores;

FIG. 4 is a first explanatory view for illustrating how a first exemplary specific text message is evaluated according to the present embodiment;

FIG. 5 is a second explanatory view for illustrating how a second exemplary specific text message is evaluated according to the present embodiment;

FIG. 8 illustrates an English translation of the first message depicted in FIG. 4(a); and FIG. 9 illustrates an English translation of the second message depicted in FIG. 5(a).

DETAILED DESCRIPTION OF THE INVENTION

General Overview

Figure 1:
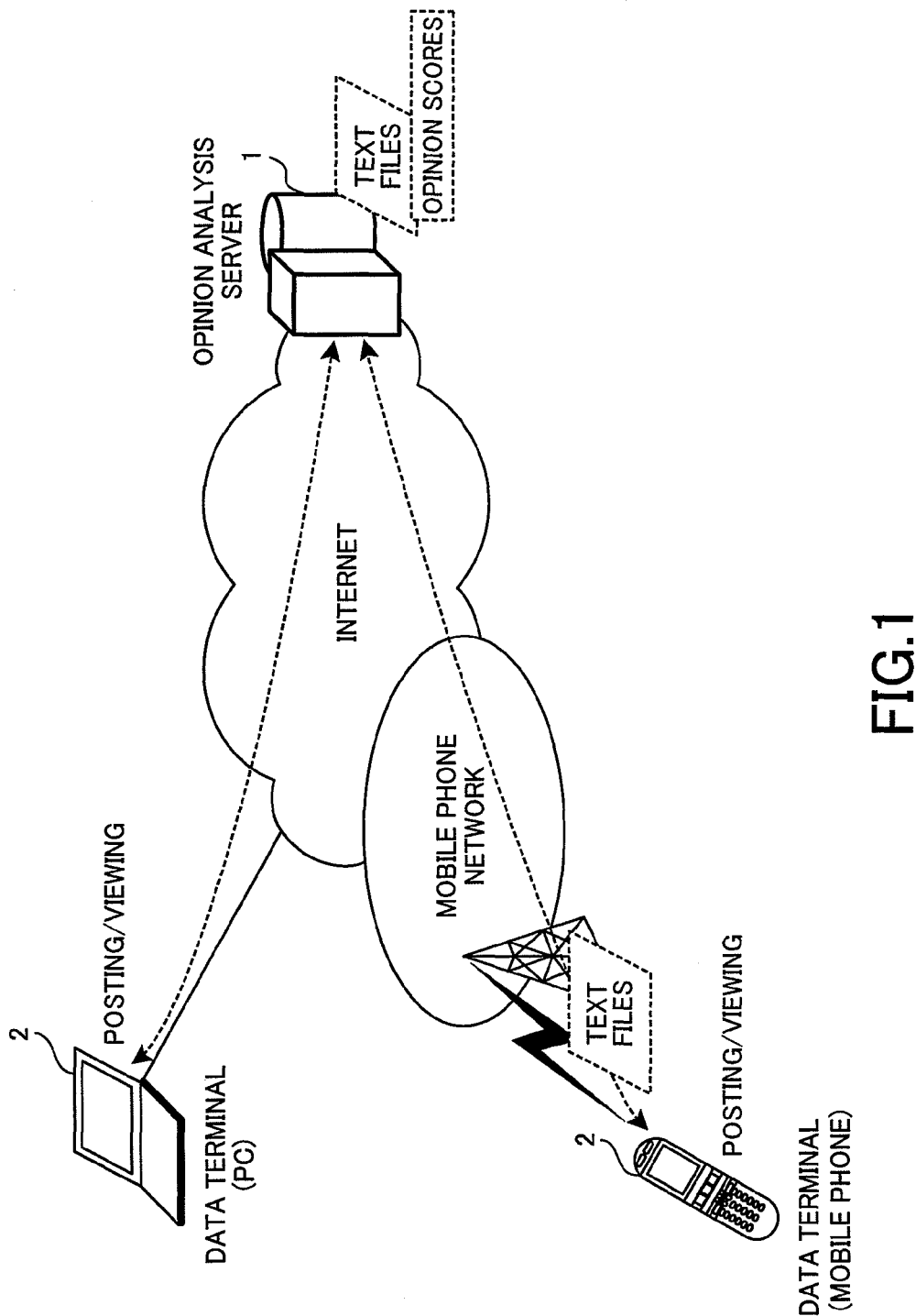
FIG. 1 is a schematic diagram illustrating a system using an opinion analysis server constructed according to an illustrative embodiment of the present invention.

According to a first aspect of the invention, there is provided a server for computing an opinion score which is a score of an opinion that a message in a text file is expected to convey regarding a subject to be evaluated, wherein the message is written using literal strings and pictorial symbols, the server comprising:

a pictorial-symbol dictionary memory storing a correspondence between designated pictorial-symbols to be rated and scores of opinions expressed by the respective pictorial-symbols;

a pictorial-symbol extractor configured to extract from the message, at least one of the used pictorial-symbols in the message which is coincident with at least one of the designated pictorial-symbols stored in the pictorial-symbol dictionary memory;

a pictorial-symbol opinion-score retriever configured to retrieve within the pictorial-symbol dictionary memory, at least one of the opinion scores which corresponds to the at least one extracted pictorial-symbol; and an opinion-score calculator configured to calculate an aggregate net opinion score for the message, based on an aggregate opinion score for the at least one extracted pictorial-symbol, wherein the aggregate opinion score is calculated with the at least one retrieved opinion score for the at least one extracted pictorial-symbol.

This server would allow an opinion which is conveyed by a text message, to be successfully analyzed and scored, even if the text message includes a pictorial symbol.

According to a second aspect of the invention, there is provided a method of computing an opinion score which is a score of an opinion that a message in a text file is expected to convey regarding a subject to be evaluated, wherein the message is written using literal strings and pictorial symbols, the method comprising the steps of:

by the use of a pictorial-symbol dictionary memory storing a correspondence between designated pictorial-symbols to be rated and scores of opinions expressed by the respective pictorial-symbols, extracting from the message, at least one of the used pictorial-symbols in the message which is coincident with at least one of the designated pictorial-symbols stored in the pictorial-symbol dictionary memory;

retrieving within the pictorial-symbol dictionary memory, at least one of the opinion scores which corresponds to the at least one extracted pictorial-symbol; and calculating an aggregate net opinion score for the message, based on an aggregate opinion score for the at least one extracted pictorial-symbol, wherein the aggregate opinion score is calculated with the at least one retrieved opinion score for the at least one extracted pictorial-symbol.

This method would allow an opinion which is conveyed by a text message, to be successfully analyzed and scored, even if the text message includes a pictorial symbol.

ILLUSTRATIVE EMBODIMENTS

According to the invention, the following modes are provided as illustrative embodiments of the invention.

According to a first mode of the invention, there is provided the server according to the first aspect of the invention, further comprising a morpheme analyzer configured to segment the message into morphemes, wherein the pictorial-symbol extractor extracts at least one of the morphemes of the segmented message, which corresponds to at least one of the designated pictorial-symbols stored in the pictorial-symbol dictionary memory.

According to a second mode of the invention, there is provided the server according to the first aspect or the first mode, further comprising:

a literal-string dictionary memory storing a correspondence between designated literal-strings to be rated and scores of opinions expressed by the respective literal-strings;

a literal-string extractor configured to extract from the message, at least one of the used literal-strings in the message which is coincident with at least one of the designated literal-strings stored in the literal-string dictionary memory; and a literal-string opinion-score retriever configured to retrieve within the literal-string dictionary memory, at least one of the opinion scores which corresponds to the at least one extracted literal-sting, wherein the opinion-score calculator calculates the aggregate net opinion score for the message, based on a sum of a first aggregate opinion score for the at least one extracted pictorial-symbol, and a second aggregate opinion score for the at least one extracted literal-string, wherein the first aggregate opinion score is calculated with the at least one retrieved opinion score for pictorial symbol, and the second aggregate opinion score is calculated with the at least one retrieved opinion score for literal string.

According to a third mode of the invention, there is provided the server according to the second mode, wherein the pictorial-symbol dictionary memory stores an additional correspondence between at least one selected pictorial-symbol and at least one intensity rate when the at least one selected pictorial-symbol is used as a linguistic modifier for describing another pictorial symbol or literal string on which the at least one selected pictorial-symbol depends linguistically, and the pictorial-symbol extractor extracts from the message, as a modificative pictorial-symbol, at least one of the used pictorial-symbols in the message which is coincident with at least one of the at least one selected pictorial-symbol stored in the pictorial-symbol dictionary memory, the server further comprising:

an intensity-rate retriever configured to retrieve within the pictorial-symbol dictionary memory, at least one of the at least one intensity rate which corresponds to the at least one extracted modificative-pictorial-symbol; and a linguistic-dependency analyzer configured to detect from the message, as a depended pictorial-symbol or literal-string, at least one of the used pictorial-symbols and literal-strings in the message on which each of the at least one extracted modificative-pictorial-symbol depends linguistically, wherein the opinion-score calculator calculates the aggregate net opinion score for the message, by multiplying the opinion score for each of the at least one detected depended-pictorial-symbol or literal-string, by the intensity rate for each of the at least one extracted modificative-pictorial-symbol, wherein the opinion score and the intensity rate are defined according to the correspondence stored in the pictorial-symbol dictionary memory.

According to a fourth mode of the invention, there is provided the server according to any one of the first aspect and the first through third modes, wherein each of the opinion scores is varied between discrete possible values, corresponding to a positive opinion and a negative opinion.

According to a fifth mode of the invention, there is provided the server according to any one of the first aspect and the first through fourth modes, wherein the server is a Web server for use in mobile phones.

According to a sixth mode of the invention, there is provided the method according to the second aspect of the invention, further comprising segmenting the message into morphemes, wherein the step of extracting includes a sub-step of extracting at least one of the morphemes of the segmented message, which corresponds to at least one of the designated pictorial-symbols stored in the pictorial-symbol dictionary memory.

According to a seventh mode of the invention, there is provided the method according to the second aspect or the sixth mode, further comprising the steps of:

by the use of a literal-string dictionary memory storing a correspondence between designated literal-strings to be rated and scores of opinions expressed by the respective literal-strings, extracting from the message, at least one of the used literal-strings in the message which is coincident with at least one of the designated literal-strings stored in the literal-string dictionary memory; and retrieving within the literal-string dictionary memory, at least one of the opinion scores which corresponds to the at least one extracted literal-sting, wherein the step of calculating includes a sub-step of calculating the aggregate net opinion score for the message, based on a sum of a first aggregate opinion score for the at least one extracted pictorial-symbol, and a second aggregate opinion score for the at least one extracted literal-string, wherein the first aggregate opinion score is calculated with the at least one retrieved opinion score for pictorial symbol, and the second aggregate opinion score is calculated with the at least one retrieved opinion score for literal string.

According to an eighth mode of the invention, there is provided the method according to the seventh mode, wherein the pictorial-symbol dictionary memory stores an additional correspondence between at least one selected pictorial-symbol and at least one intensity rate when the at least one selected pictorial-symbol is used as a linguistic modifier for describing another pictorial symbol or literal string on which the at least one selected pictorial-symbol depends linguistically, and the step of extracting includes a sub-step of extracting from the message, as a modificative pictorial-symbol, at least one of the used pictorial-symbols in the message which is coincident with at least one of the at least one selected pictorial-symbol stored in the pictorial-symbol dictionary memory;

the method further comprising the steps of:

retrieving within the pictorial-symbol dictionary memory, at least one of the at least one intensity rate which corresponds to the at least one extracted modificative-pictorial-symbol; and detecting from the message, as a depended pictorial-symbol or literal-string, at least one of the used pictorial-symbols on which each of the at least one extracted modificative-pictorial-symbol depends linguistically, wherein the step of calculating includes a sub-step of calculating the aggregate net opinion score for the message, by multiplying the opinion score for each of the at least one detected depended-pictorial-symbol or literal-string, by the intensity rate for each of the at least one extracted modificative-pictorial-symbol, wherein the opinion score and the intensity rate are defined according to the correspondence stored in the pictorial-symbol dictionary memory.

According to another aspect of the invention, there is provided a computer-readable medium having stored therein a program which, when executed by a computer, effects the method according to any one of the second aspect and the sixth through eighth modes.

The "computer-readable medium" may be in the form of any one of a variety of types, including a magnetic recording medium, such as a flexible-disc, an optical recording medium, such as a CD and a CD-ROM, an optical-magnetic recording medium, such as an MO, an un-removable storage, such as a ROM, for example.

Several presently preferred embodiments of the invention will be described in more detail by reference to the drawings in which like numerals are used to indicate like elements throughout.

Referring now to FIG. 1, the configuration of a system is schematically illustrated, which incorporates an opinion analysis server 1 constructed according to an illustrative embodiment of the present invention.

As illustrated in FIG. 1, with the opinion analysis server 1, a plurality of data terminals (e.g., in the form of PCs (personal computers) and mobile phones) 2 can be connected via a network such as the Internet or a mobile phone network.

FIG. 1 illustrates a first representative data terminal in the form of a PC (personal computer) denoted by "2," and a second representative data terminal in the form of a mobile phone denoted by "2." The PC 2 and the mobile phone 2 can be collectively referred to as, for example, a data terminal, a terminal device, a communication device, or the like.

The opinion analysis server 1 is configured to store text files transmitted or submitted from the mobile phone 2, for example, to allow the text files being stored to be accessed from any third parties, and to analyze an opinion score which is the score of an opinion (e.g., a sentiment, a reputation, or the like) that a message in each text file is expected to convey regarding a subject to be evaluated. The opinion analysis server 1 may be a Web server (not shown) for use in the mobile phones 2, for example.

A "text file" which is processed in the present embodiment is composed with not only literal strings in text (i.e., writing, letters), but also "pictorial symbols" which are distinct from characters in an ordinary text.

In the present embodiment, the opinion analysis server 1 supports messages in text files which are written in Japanese language in which word boundaries are not indicated by blank spaces.

A "pictorial symbol," which can be also referred to as a "pictogram," is an abbreviated graphic representation of a particular meaning or content (e.g., emotion), and can be universally understood regardless of language. Such a pictorial symbol can be understood by all the possible users, even if their native languages are different from a language used in the data terminal or mobile phone 2.

A pictorial symbol is used frequently in e-mail (i.e., electronic mail) messages exchanged between the mobile phones 2, in particular. For example, for creation of pictorial symbols, various pictures or images (i.e., icons) of "smiley face," "weeping face," "heart shape," and the like are provided as graphical representations of respective emotions. Such a pictorial symbol is used when creating an e-mail message containing a text, for such a pictorial symbol to act as an icon easily representing a particular emotion.

"Pictorial symbols" are assigned respective character codes different from those for an ordinary text. Typically, literal characters in text are encoded in ASCII (American Standard Code for Information Interchange) code for half-width alphanumeric characters, JIS code or SHIFT-JIS code for characters such as Japanese kanji characters, Unicode for multi-language characters, and the like.

For pictorial symbols, however, the carriers for the mobile phones 2 have uniquely defined their own pictorial symbols and character codes without any overlaps with those for literal characters in text. For this reason, identical pictorial symbols cannot be always displayed as identical images on display screens of the different mobile phones 2, if the carriers or manufacturers of the mobile phones 2 are not identical.

There is a case in which a particular carrier transmits a signal for the content of a pictorial symbol between the mobile phones 2 after an escape code. In this case, the escape code indicates that "subsequent data is data for a pictorial symbol." As a result, a text editor which is one of applications in the data terminal 2 such as a personal computer cannot support any pictorial symbol.

As will be understood from the above, literal characters in text and pictorial symbols are different in writing scheme such as coding scheme.

FIG. 2 illustrates a pictorial-symbol dictionary table indicating how designated pictorial symbols are assigned opinion scores.

More specifically, as illustrated in the table of FIG. 2, there is a correspondence between the designated pictorial symbols, categories, titles, opinion scores, and intensity rates, on a per-pictorial-symbol basis.

By definition, each of the "opinion scores," in a simplest implementation, illustratively, corresponds to one of a positive opinion and a negative opinion. In this implementation, each opinion score is defined, illustratively, such that it is "+1" for a positive opinion, while it is "−1" for a negative opinion.

By definition, each of the "intensity rates" means the rate or factor of intensity which a corresponding one of the pictorial symbols exhibits, when the corresponding pictorial symbol is used as a linguistic modifier (e.g., an adverb) for describing another pictorial symbol in the same message in a text file, on which the corresponding pictorial symbol depends linguistically.

In this implementation, finally, individual opinion-scores of all the pictorial symbols contained in the same message in a text file are summed up or aggregated to a total opinion-score or an aggregate net opinion score, and, based on the aggregate net opinion score, "how strongly the message conveys either a positive opinion or a negative opinion" is expressed.

As illustrated in FIG. 2, a pictorial symbol which is titled "Twinkling" and which is categorized as "Emotion and Human Body" is assigned an opinion score of "Positive P." A pictorial symbol which is titled "Heart" and which is categorized as "Emotion and Human Body" is assigned an opinion score of "Positive P," as well.

In contrast, a pictorial symbol which is titled "Tear Dropping" and which is categorized as "Face and Expression" is assigned an opinion score of "Negative N." A pictorial symbol which is titled "Impatience" and which is categorized as "Emotion and Expression" is assigned an opinion score of "Negative N," as well.

Further, as illustrated in FIG. 2, a pictorial symbol which is titled "Emphasis" and which is categorized as "Emotion and Human Body" is assigned an intensity rate of "1.2." A pictorial symbol which is titled "Triumph" and which is categorized as "Face and Expression" is assigned an intensity rate of "1.1."

FIG. 3 illustrates a literal-string dictionary table indicating how designated literal strings are assigned opinion scores.

More specifically, as illustrated in the table of FIG. 3, there is a correspondence between the designated literal strings and opinion scores, on a per-literal-string basis. Illustratively, a literal string of "SU-PE-SYA-RU (i.e., "Special" in English)" and a literal string of "U-KI-U-KI (i.e., "Floating on air" in English)" are each assigned an opinion score of "Positive P." In contrast, a literal string of "KU-YA-SHI-I (i.e., "Disappointed" in English)" and a literal string of "BA-KA-YA-RO (i.e., "How foolish I am" in English)" are each assigned an opinion score of "Negative N."

Figure 4:
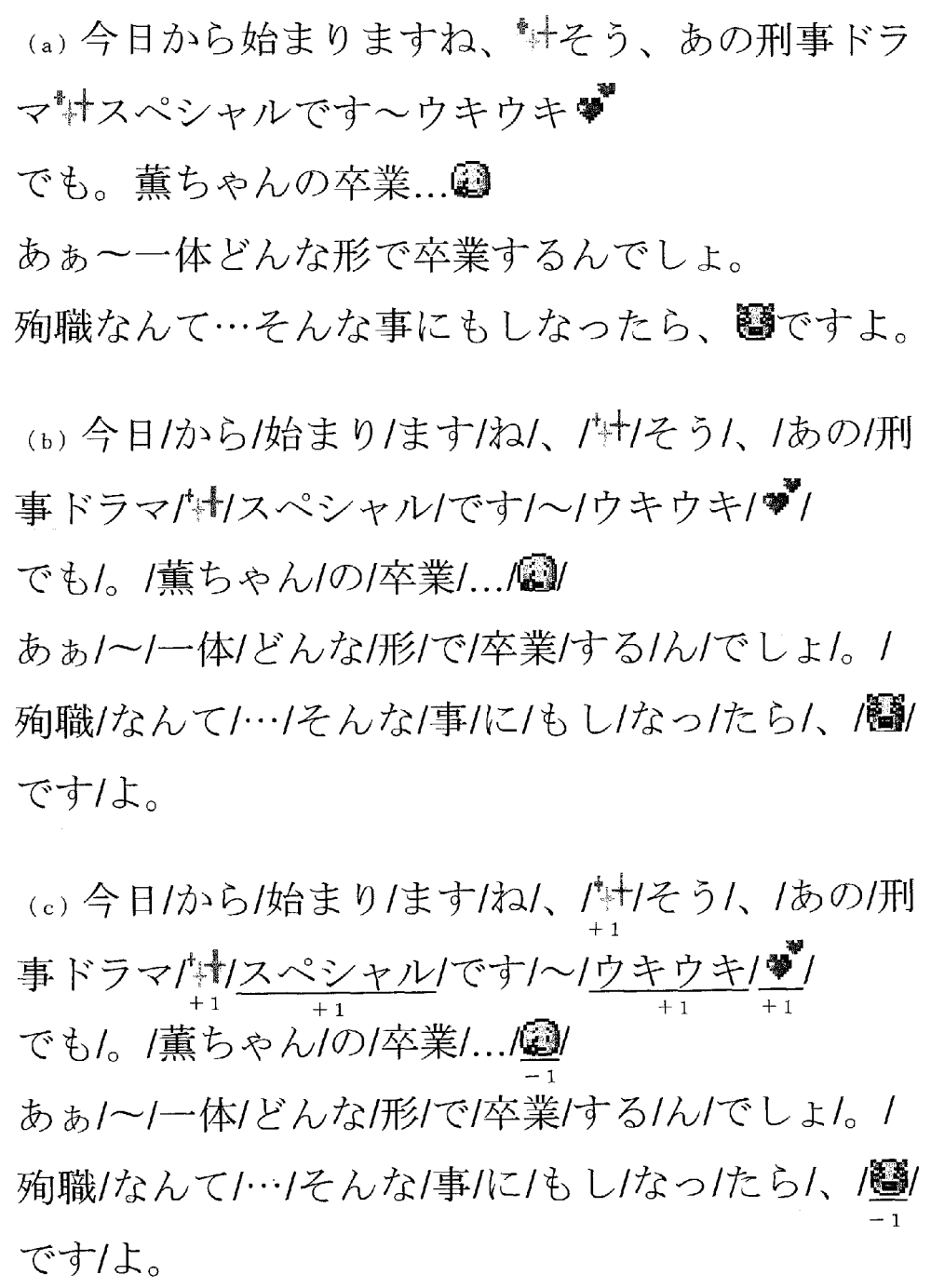

FIG. 4 is a first explanatory view for illustrating how a specific exemplary message is evaluated according to the present embodiment.

FIG. 4(a) illustrates a first original message which has been written actually by a user, using not only literal strings but also pictorial symbols, regarding a particular TV program. In this example, the TV program is a subject to be evaluated. For people who do not really understand Japanese, an English translation of the first original message has been prepared in FIG. 8.

FIG. 4(b) illustrates how the first original message depicted in FIG. 4(a) has been segmented into a plurality of morphemes by morphological analysis according to the present embodiment.

The morphological analysis is one of technologies for natural language processing using a computer. By this morphological analysis, a given text (e.g., a given message) which is made of one or more strings of characters of natural language, is segmented into morphemes each of which is the smallest linguistic unit that has semantic meaning, and then, a part-of-speech of each morpheme is determined. The part-of-speech determination requires a dictionary having stored therein grammatical rules for a given language and part-of-speech-tagged words.

In the present embodiment, a given message is segmented into morphemes, such that each pictorial symbol in the message corresponds to a single morpheme.

As illustrated in FIG. 4(c), selected ones of those morphemes are each scored Positive "+1" or Negative "−1," according to the pictorial-symbol dictionary table depicted in FIG. 2 and the literal-string dictionary table depicted in FIG. 3.

More specifically, the selected morphemes are scored or rated as follows:

Pictorial-symbol "Twinkling" (first occurrence): +1,
Pictorial-symbol "Twinkling" (second occurrence): +1,
Literal-string "Special": +1,
Literal-string "Floating on air": +1,
Pictorial-symbol "Heart": +1,
Pictorial-symbol "Tear dropping": −1, and
Pictorial-symbol "Impatience": −1.

For the message illustrated in FIG. 4(a), the aggregate net opinion score amounts to "+3," because

+1+1+1+1+1+(−1)+(−1)=+3.

FIG. 5 is a second explanatory view for illustrating how a specific exemplary message is evaluated according to the present embodiment.

FIG. 5(a) illustrates a second original message which has been written actually by a user, using not only literal strings but also pictorial symbols, regarding another particular TV program. For people who do not really understand Japanese, an English translation of the second original message has been prepared in FIG. 9.

FIG. 5(b) illustrates how the second original message depicted in FIG. 5(a) has been segmented into a plurality of morphemes by morphological analysis according to the present embodiment.

As illustrated in FIG. 5(c), selected ones of those morphemes are each scored Positive "+1" or Negative "−1," according to the pictorial-symbol dictionary table depicted in FIG. 2 and the literal-string dictionary table depicted in FIG. 3.

More specifically, the selected morphemes are scored as follows:

Pictorial-symbol "Tear dropping": −1,
Literal-string "Disappointed" (first occurrence): −1,
Pictorial-symbol "Emphasis" (first occurrence): 1.2 (Intensity Rate),
Literal-string "Disappointed" (second occurrence): −1,
Literal-string "How foolish I am": −1, and
Pictorial-symbol "Emphasis" (second occurrence): 1.2 (Intensity Rate).

In this example, the first-occurring pictorial-symbol "Emphasis," acting as a modificative pictorial-symbol, depends on the first-occurring literal-string "Disappointed." The second-occurring pictorial-symbol "Emphasis," acting as a modificative pictorial-symbol, depends on the literal-string "How foolish I am".

Therefore, the aggregate net opinion score for the message depicted in FIG. 5(a) amounts to "−4.4," because (−1)+(−1×1.2)+(−1)+(−1×1.2)=−4.4.

In this regard, which literal string or pictorial symbol a modificative pictorial-symbol depends on is determined by known Syntactic Analysis. The Syntactic Analysis, which is also referred to as "parsing" or "parser," is used to analyze a text to determine its grammatical structure.

By the Syntactic Analysis, typically, a tree data-structure in the input text, and tokens based on Lexical Analysis are entered, and a data structure such as a parse tree or an abstract syntax tree is built with respect to a given formal grammar. This can determine which literal string or pictorial symbol a modificative pictorial-symbol (or literal string) depends on.

In an example, for a modificative pictorial-symbol, a literal string located immediately before the modificative pictorial-symbol in the text message is determined to be a literal string on which the modificative pictorial-symbol depends.

Figure 6:
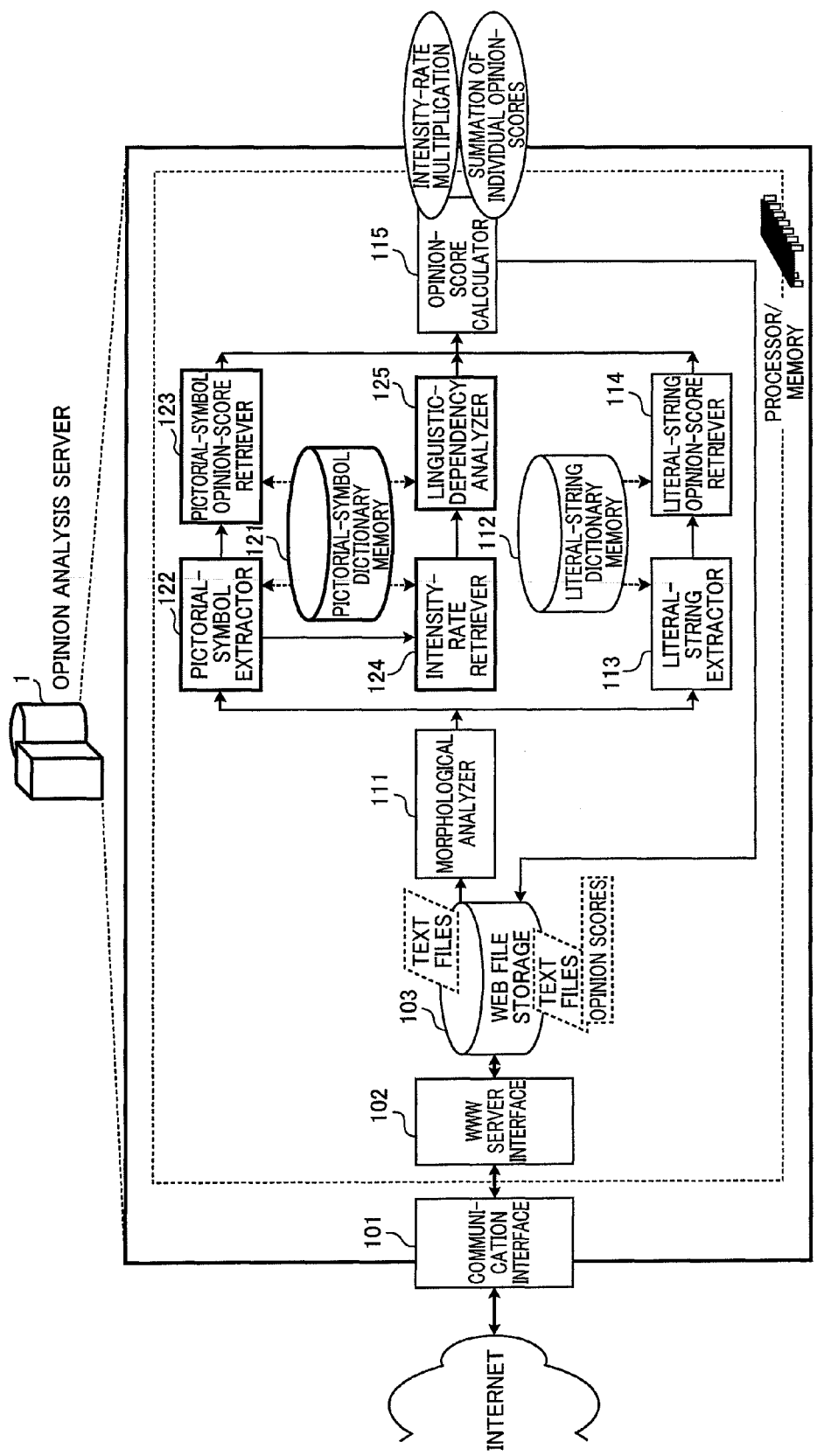
FIG. 6 is a functional block diagram illustrating the opinion analysis server depicted in FIG. 1.

FIG. 6 illustrates in a functional block diagram the opinion analysis server 1 according to the present embodiment.

As illustrated in FIG. 6, the opinion analysis server 1 is configured to include: a communication interface 101 allowing for communication with the data terminal 2; a WWW (World Wide Web) server interface 102 acting as a WWW server for the data terminal 2; and a Web file storage 103 for storage of text files which have been posted or submitted and can be viewed or accessed by any third parties. The opinion analysis server 1 may be a Web server for use in, for example, the mobile phones 2.

The opinion analysis server 1, which provides a pre-defined opinion analysis service, is further configured to include as basic functions: a morphological analyzer 111; a literal-string dictionary memory 112; a literal-string extractor 113; a literal-string opinion-score retriever 114; and an opinion-score calculator 115. These basic functions are provided by executing an opinion analysis program (which will be described below by reference to the flowchart of FIG. 7) by a computer (including a processor and a memory, as illustrated in FIG. 6) built in the opinion analysis server 1.

The morphological analyzer 111 inputs a text file to be analyzed or evaluated, from the Web file storage 103, and then segments a message in the input text file into a plurality of morphemes. These morphemes of the segmented message are outputted into the literal-string extractor 113.

The literal-string dictionary memory 112 has stored therein a correspondence between designated pictorial symbols to be rated and scores of opinions expressed by the respective pictorial symbols, as illustrated in such as FIG. 3. In an example, each opinion score is varied between discrete possible values, corresponding to a positive opinion and a negative opinion.

The literal-string extractor 113 extracts from all the morphemes of the input message, ones of these morphemes which are coincident with ones of the designated literal strings stored in the literal-string dictionary memory 112. This extraction equals to extraction from all the designated literal strings stored, the same literal strings that are used in the message. The extracted literal strings are outputted into the literal-string opinion-score retriever 114.

The literal-string opinion-score retriever 114 retrieves within all the opinion scores stored in the literal-string dictionary memory 112, ones of these opinion scores which correspond to the extracted literal strings. The retrieved opinion scores are outputted into the opinion-score calculator 115.

As described in more detail below, the opinion-score calculator 115 calculates an aggregate net opinion score for the message, based on an aggregate opinion score for all the extracted literal strings. The aggregate opinion score is calculated based on all the retrieved opinion scores for all the extracted literal strings.

The opinion-score calculator 115 associates the calculated aggregate net opinion score with the current text file within the Web file storage 103. In an example, within the Web file storage 103, the calculated aggregate net opinion score is stored in association with the ID number or name of the current text file.

The opinion analysis server 1 according to the present embodiment is further configured to additionally include: a pictorial-symbol dictionary memory 121; a pictorial-symbol extractor 122; a pictorial-symbol opinion-score retriever 123; an intensity-rate retriever 124; and a linguistic-dependency extractor 125. These functions are provided by executing the aforementioned opinion analysis program by the aforementioned computer built in the opinion analysis server 1.

The morphological analyzer 111 as described above is configured to output the same morphemes of the segmented message to the pictorial-symbol extractor 122, in addition to the literal-string extractor 113.

The pictorial-symbol dictionary memory 121 has stored therein a correspondence between designated pictorial symbols to be rated and scores of opinions expressed by the respective pictorial symbols, as illustrated in such as FIG. 2.

The pictorial-symbol dictionary memory 121 has stored therein an additional correspondence between selected pictorial symbols and intensity rates. The intensity rates indicate how strongly the selected pictorial symbols modify or intensify another portion of the same message, when the selected pictorial symbol are used each as a linguistic modifier (e.g., an adverb) for describing another pictorial symbol or literal string on which the selected pictorial-symbols depend linguistically.

The pictorial-symbol extractor 122 extracts from all the morphemes of the input message, ones of these morphemes which are coincident with ones of the designated pictorial symbols stored in the pictorial-symbol dictionary memory 121. This extraction equals to extraction from all the designated pictorial-symbols stored, the same pictorial symbols that are used in the message. The extracted pictorial symbols are outputted into the pictorial-symbol opinion-score retriever 123.

The pictorial-symbol extractor 122 further extracts from all the morphemes of the input message, each as a modificative pictorial-symbol, ones of these morphemes which are coincident with ones of the selected pictorial symbols (i.e., modifiers) stored in the pictorial-symbol dictionary memory 121. The extracted modificative-pictorial-symbols are outputted into the intensity-rate retriever 124.

The pictorial-symbol opinion-score retriever 123 retrieves within the pictorial-symbol dictionary memory 121, ones of the opinion scores stored, which correspond to the extracted pictorial symbols. The retrieved opinion scores are outputted into the opinion-score calculator 115.

The intensity-rate retriever 124 retrieves within the pictorial-symbol dictionary memory 121, ones of the intensity rates correspond to the extracted modificative-pictorial-symbols. The retrieved intensity rates are outputted into the linguistic-dependency analyzer 125.

The linguistic-dependency analyzer 125 detects from all the morphemes of the input message, each as a depended pictorial symbol or literal string, ones of these morphemes on which the extracted modificative-pictorial-symbols depend linguistically. This is performed by the Syntactic Analysis as described before.

The opinion-score calculator 115 calculates the aggregate net opinion score for the message, as the sum of a first aggregate opinion score for all the extracted pictorial symbols (including the detected depended-pictorial-symbols and the extracted non-modificative-pictorial-symbols, but excluding the extracted modificative-pictorial-symbols), and a second aggregate opinion score for all the extracted literal strings (including the detected depended-literal-strings).

The opinion-score calculator 115 calculates the first aggregate opinion score, by summing up all the retrieved opinion scores for the extracted pictorial symbols, such that, only for the depended pictorial-symbols, they are summed up after being multiplied by the intensity rates of the extracted modificative-pictorial-symbols. Similarly, the opinion-score calculator 115 calculates the second aggregate opinion score, by summing up all the retrieved opinion scores for the extracted literal strings, such that, only for the depended literal strings, they are summed up after being multiplied by the intensity rates of the extracted modificative-pictorial-symbols. The calculation is performed in a manner as illustrated using two specific examples depicted in FIGS. 4 and 5.

As described before, the calculated aggregate net opinion score for the current text file is associated with the current text file within the Web file storage 103. These text file and aggregate net opinion score can be viewed together or simultaneously by the user of the data terminal 2.

The user of the data terminal 2 who is interested in a particular subject (e.g., a TV program, a product, a service, an event, or the like), once having accessed the Web file storage 103 in search of the opinion analysis result of other users sentiments or reviews on the particular subject, can easily view the scores of those sentiments or reviews, without closely reading other users messages which are commenting on the particular subject, only by glancing at the figures or graphics representing the scored or rated opinions on the display screen of the data terminal 2.

Figure 7:
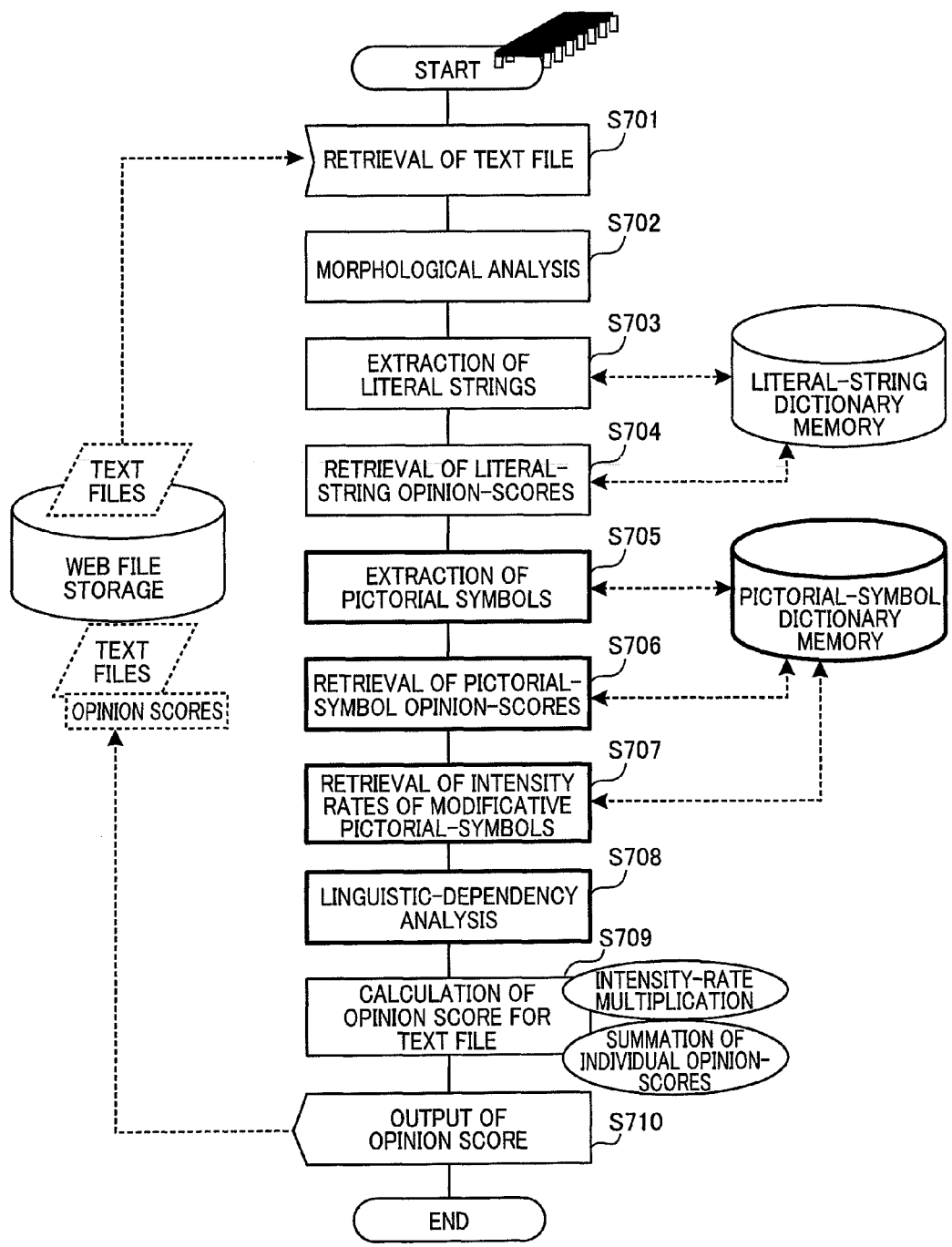
FIG. 7 is a flow chart conceptually illustrating an opinion analysis program to be executed by a computer in the opinion analysis server depicted in FIG. 1.

FIG. 7 is a flow chart for explanation of the process implemented according to the present embodiment.

FIG. 7 illustrates steps of the aforementioned opinion analysis program which is executed by the computer built in the opinion analysis server 1. It is added that the pictorial-symbol dictionary memory 121 has stored the pictorial-symbol dictionary table depicted in FIG. 2, and the literal-string dictionary memory 112 has stored the literal-string dictionary table depicted in FIG. 3.

(S701) A text file is entered which is written using literal strings and pictorial symbols.

(S702) A message in the text file is segmented into a plurality of morphemes.

(S703) Using the literal-string dictionary table, ones of the morphemes of the segmented message are extracted from the message, which correspond to ones of the designated literal strings stored in the table.

(S704) Using the literal-string dictionary table, ones of the opinion scores stored in the table are retrieved, which correspond to the extracted literal strings.

(S705) Using the pictorial-symbol dictionary table, ones of the morphemes of the segmented message are extracted from the message, which correspond to ones of the designated pictorial-symbols (including the selected modificative-pictorial-symbols) stored in the table.

(S706) Using the pictorial-symbol dictionary table, ones of the opinion scores stored in the table are retrieved, which correspond to the extracted pictorial symbols.

(S707) Using the pictorial-symbol dictionary table, ones of the intensity rates stored in the table are retrieved, which correspond to the extracted modificative-pictorial-symbols.

(S708) Ones of the extracted literal strings and pictorial symbols are detected, on which the extracted modificative-pictorial-symbols depend.

(S709) The aggregate net opinion score is calculated based on the sum of the first aggregate opinion score for the extracted literal strings and the second aggregate opinion score for the extracted pictorial symbols, after only the opinion scores for the depended literal strings or pictorial symbols are multiplied by the retrieved intensity rates for the extracted modificative-pictorial-symbols.

(S710) The calculated aggregate net opinion score is outputted in association with the current text file.

As will be understood from the foregoing description, the opinion analysis server 1, its operating method and its computer program allow a text message, even if it uses pictorial symbols, which is sent from, for example, the mobile phone 2, to be analyzed for scoring an opinion which the text message is expected to convey.

Although the present embodiment has been described above, with a text message written in Japanese language, the invention may be practiced for opinion analysis of a text file written in English language or other languages (e.g., Chinese language, Korean language, or German language).

However, for analyzing a text file written in language such as English language in which word boundaries are indicated by blank spaces, without any need for word segmentation, the invention may be practiced by completely or partially abbreviating the whole process of the Morphological Analysis.

In an exemplary modified implementation of the present embodiment, it may categorize or identify the subject addressed in a message in the input text file, using the message, in a manner such as disclosed in, for example, U.S. Pat. No. 7,600,017, the content of which is incorporated hereinto by reference in its entirety.

In this implementation, the input text file may be stored in association with the subject identified, and the calculated aggregate net opinion score (e.g., a positive score or a negative score).

It is added that the present invention may be practiced, such that the morphological analysis is performed only for pictorial symbols in a text message, or otherwise the morphological analysis is performed for both pictorial symbols and literal strings in a text message.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A server for computing an opinion score which is a score of an opinion that a message in a text file is expected to convey regarding a subject to be evaluated, wherein the message is written using literal strings and pictorial symbols, the server comprising:
 a pictorial-symbol dictionary memory storing a correspondence between designated pictorial-symbols to be rated and scores of opinions expressed by the respective pictorial-symbols;
 a pictorial-symbol extractor configured to extract from the message, at least one of the used pictorial-symbols in the message which is coincident with at least one of the designated pictorial-symbols stored in the pictorial-symbol dictionary memory;
 a pictorial-symbol opinion-score retriever configured to retrieve within the pictorial-symbol dictionary memory, at least one of the opinion scores which corresponds to the at least one extracted pictorial-symbol; and
 an opinion-score calculator configured to calculate an aggregate net opinion score for the message, based on an aggregate opinion score for the at least one extracted pictorial-symbol, wherein the aggregate opinion score is calculated with the at least one retrieved opinion score for the at least one extracted pictorial-symbol,
 wherein the pictorial-symbol dictionary memory stores an additional correspondence between at least one selected pictorial-symbol and at, least one intensity rate when the at least one selected pictorial-symbol is used as a linguistic modifier for describing another pictorial symbol on which the at least one selected pictorial-symbol depends linguistically, and
 the pictorial-symbol extractor extracts from the message, as a modificative pictorial-symbol, at least one of the used pictorial-symbols in the message which is coincident with at least one of the at least one selected pictorial-symbol stored in the pictorial-symbol dictionary memory,
 the server further comprising:
 an intensity-rate retriever configured to retrieve within the pictorial-symbol dictionary memory, at least one of the at least one intensity rate which corresponds to the at least one extracted modificative-pictorial-symbol; and
 a linguistic-dependency analyzer configured to detect from the message, as a depended pictorial-symbol, at least one of the used pictorial-symbols in the message on which each of the at least one extracted modificative-pictorial-symbol depends linguistically,
 wherein the opinion-score calculator calculates the aggregate net opinion score for the message, by multiplying the opinion score for each of the at least one detected depended-pictorial-symbol, by the intensity rate for each of the at least one extracted modificative-pictorial-symbol, wherein the opinion score and the intensity rate are defined according to the correspondence stored in the pictorial-symbol dictionary memory.

2. The server according to claim 1, further comprising a morpheme analyzer configured to segment the message into morphemes, wherein the pictorial-symbol extractor extracts at least one of the morphemes of the segmented message, which corresponds to at least one of the designated pictorial-symbols stored in the pictorial-symbol dictionary memory.

3. The server according to claim 1, further comprising:
 a literal-string dictionary memory storing a correspondence between designated literal-strings to be rated and scores of opinions expressed by the respective literal-strings;
 a literal-string extractor configured to extract from the message, at least one of the used literal-strings in the message which is coincident with at least one of the designated literal-strings stored in the literal-string dictionary memory; and a literal-string opinion-score retriever configured to retrieve within the literal-string dictionary memory, at least one of the opinion scores which corresponds to the at least one extracted literal-sting, wherein the opinion-score calculator calculates the aggregate net opinion score for the message, based on a sum of a first aggregate opinion score for the at least one extracted pictorial-symbol, and a second aggregate opinion score for the at least one extracted literal-string, wherein the first aggregate opinion score is calculated with the at least one retrieved opinion, score for pictorial symbol, and the second aggregate opinion, score is calculated with the at least one retrieved opinion score for literal string.

4. The server according to claim 1, wherein each of the opinion scores is varied between discrete possible values, corresponding to a positive opinion and a negative opinion.

5. The server according to claim 1, wherein the server is a Web server for use in mobile phones.

6. A method of computing an opinion score which is a score of an opinion that a message in a text file is expected to convey regarding a subject to be evaluated, wherein the message is written using literal strings and pictorial symbols, the method comprising the steps of:

by the use of a pictorial-symbol dictionary memory storing a correspondence between designated pictorial-symbols to be rated and scores of opinions expressed by the respective pictorial-symbols, extracting from the message, at least one of the used pictorial-symbols in the message which is coincident with at least one of the designated pictorial-symbols stored in the pictorial-symbol dictionary memory;

retrieving within the pictorial-symbol dictionary memory, at least one of the opinion scores which corresponds to the at least one extracted pictorial-symbol; and calculating an aggregate net opinion score for the message, based on an aggregate opinion score for the at least one extracted pictorial-symbol, wherein the aggregate opinion score is calculated with the at least one retrieved opinion score for the at least one extracted pictorial-symbol, wherein the pictorial-symbol dictionary memory stores an additional correspondence between at least one selected pictorial-symbol and at least one intensity rate when the at least one selected pictorial-symbol is used as a linguistic modifier for describing another pictorial symbol on which the at least one selected pictorial-symbol depends linguistically, and the step of extracting includes a sub-step of extracting from the message, as a modificative pictorial-symbol, at least one of the used pictorial-symbols in the message which is coincident with at least one of the at least one selected pictorial-symbol stored in the pictorial-symbol dictionary memory, the method further comprising the steps of:

retrieving within the pictorial-symbol dictionary memory, at least one of the at least one intensity rate which corresponds to the at least one extracted modificative-pictorial-symbol; and detecting from the message, as a depended pictorial-symbol, at least one of the used pictorial-symbols on which each of the at least one extracted modificative-pictorial-symbol depends linguistically, wherein the step of calculating includes a sub-step of calculating the aggregate net opinion score for the message, by multiplying the opinion score for each of the at least one detected depended-pictorial-symbol, by the intensity rate for each of the at least one extracted modificative-pictorial-symbol, wherein the opinion score and the intensity rate are defined according to the correspondence stored in the pictorial-symbol dictionary memory.

7. The method according to claim 6, further comprising segmenting the message into morphemes, wherein the step of extracting includes a sub-step of extracting at least, one of the morphemes of the segmented message, which corresponds to at least one of the designated pictorial symbols stored in the pictorial-symbol dictionary memory.

8. The method according to claim 6, further comprising the steps of:

by the use of a literal-string dictionary memory storing a correspondence between designated literal-strings to be rated and scores of opinions expressed by the respective literal-strings, extracting from the message, at least one of the used literal-strings in the message which is coincident with at least one of the designated literal-strings stored in the literal-string dictionary memory; and retrieving within the literal-string dictionary memory, at least one of the opinion scores which corresponds to the at least one extracted literal-sting, wherein the step of calculating includes a sub-step of calculating the aggregate net opinion score for the message, based on a sum of a first aggregate opinion score for the at least one extracted pictorial-symbol, and a second aggregate opinion score for the at least one extracted literal-string, wherein the first aggregate opinion score is calculated with the at least one retrieved opinion score for pictorial symbol, and the second aggregate opinion score is calculated with the at least one retrieved opinion score for literal string.

* * * * *